United States Patent [19]
Shoemaker

[11] 3,807,848
[45] Apr. 30, 1974

[54] COMBINED CARRIERS AND VIEWERS FOR PROJECTORS

[76] Inventor: Robert L. Shoemaker, 1017 Elm St., Winnetka, Ill. 60093

[22] Filed: June 2, 1972

[21] Appl. No.: 259,140

[52] U.S. Cl. .................................. 353/72, 353/71
[51] Int. Cl. .......................................... G03b 21/30
[58] Field of Search ............ 353/71, 72, 73, 77, 98, 353/99, 78, 79, 119, 122; 350/117, 123; 352/104

[56] References Cited
UNITED STATES PATENTS

| | | | |
|---|---|---|---|
| 2,361,398 | 10/1944 | Harris et al. | 353/72 |
| 2,299,657 | 10/1942 | Rystedt | 353/72 |
| 3,650,614 | 3/1972 | Shimoda et al. | 353/72 |

*Primary Examiner*—Harry N. Haroian
*Attorney, Agent, or Firm*—S. J. Lehrer

[57] ABSTRACT

A carrier for a photographic projector which combines a viewer with the same. The carrier is flat to fit in low storage space and contains a standard projector on a base. A hood is attached over the base, the hood having a mirror in one end and a screen at the other. The projector is removable for independently casting images on a large screen before an audience, or to receive the hood as a viewer when images are cast on the mirror by the projection and reflected through the screen. For this purpose the hood has means connecting it with the projector so compactly as to accommodate the combination on a desk for individual rear-viewing use.

7 Claims, 9 Drawing Figures

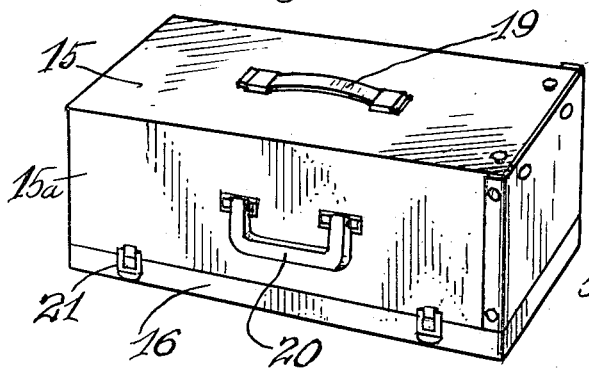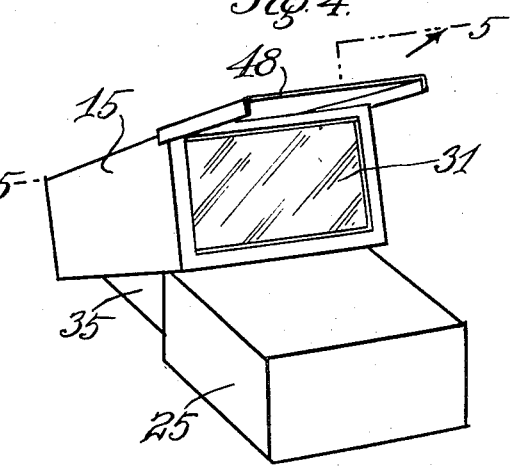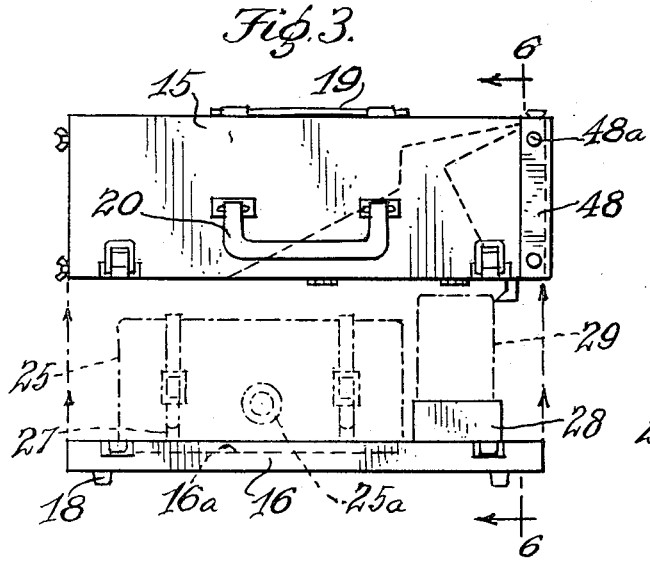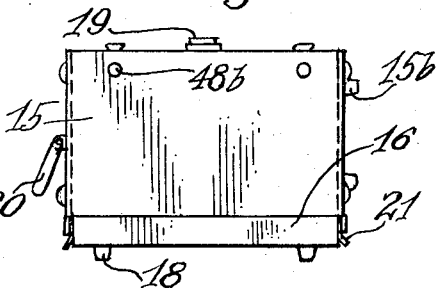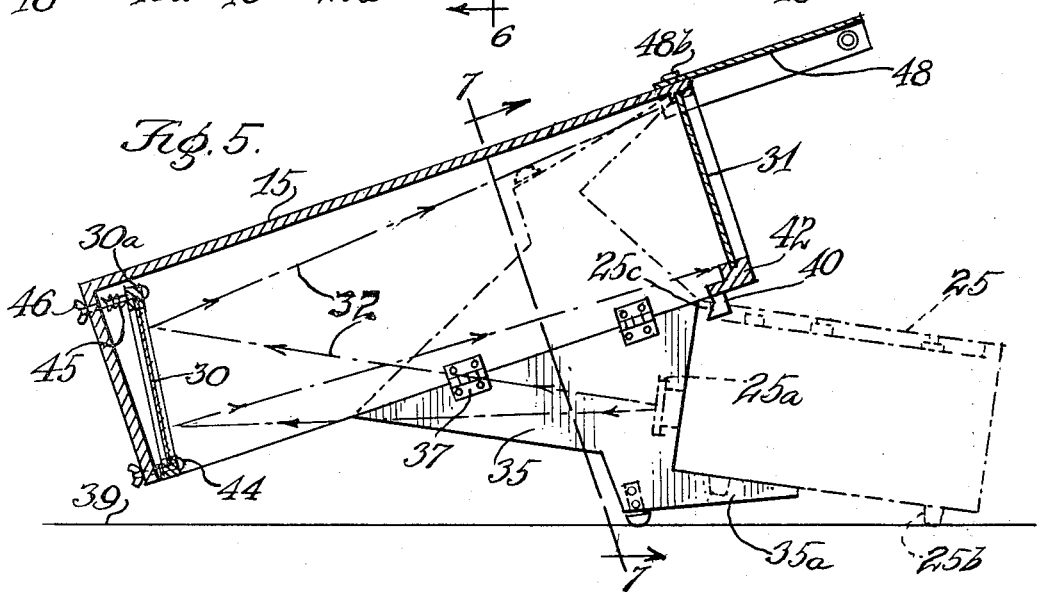

COMBINED CARRIERS AND VIEWERS FOR PROJECTORS

My invention relates to equipment for casting images from slides, film strips or motion picture films on a screen, and more particularly to portable apparatus designed for exhibiting the images either to group audiences or individuals. Apparatus for this purpose is made in separate forms for either use, or in combined form. Where the exhibitor uses the form of his choice according to the environment of its use either locally or when traveling, no problem is involved. However, when the combined form of apparatus is used to make either form convenient, the equipment is either too large or heavy, too complicated, or not compact enough to fit limited luggage space allowed for air travel.

In order to overcome the above disadvantages, one object of the present invention is to provide a combined projector carrier and viewer which is compact both for handling as a piece of luggage or storing in limited luggage space allowed for air travel.

A further object is to design an apparatus which contains a support for using a projector in the ordinary manner to project an image on a large screen, such as before a group or audience, and also to contain a unit which is adaptable for alternate rear screen viewing on a desk or in a limited area.

Another object is to design the combined carrier and viewer in a form similar to a piece of luggage easily carried by means of a handle, the viewer containing means for setting it up with a shadow box using the projector to cast an image on a rear screen.

A still further object is to include features in the combined carrier and viewer which make for convenience and maximum efficiency for its uses as specified.

A better understanding of the invention may be gained by reference to the accompanying drawings, in which -

FIG. 1 is a perspective view showing the combined carrier and viewer as a piece of luggage sufficiently low and small to fit under an airplane seat, and in a position for setting it up as stated;

FIG. 2 is an elevation of the showing in FIG. 1 from the right-hand side;

FIG. 3 is an elevation similar to the showing in FIG. 1 with an enclosing hood raised from a base portion;

FIG. 4 is a perspective showing of the combined carrier and viewer set up with a rear screen for handy individual use, such as on a desk;

FIG. 5 is an enlarged section on the line 5—5 of FIG. 4 showing the interior of the viewer and its connection with the projector;

Figure 6:
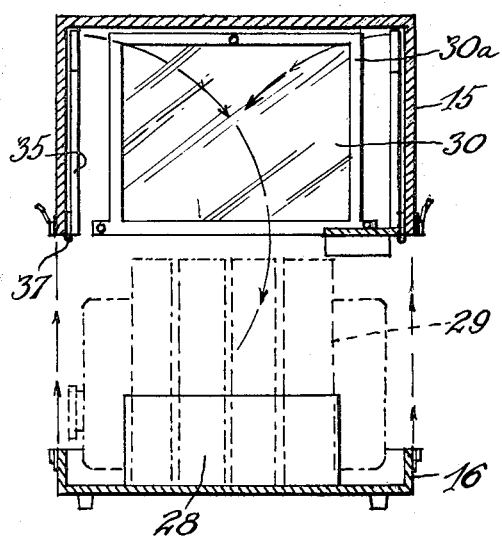
FIG. 6 is an enlarged section on the line 6—6 of FIG. 3.

Referring specifically to the drawings, 15 denotes the upper part of the apparatus in the form of an oblong hood, and 16 its base to match. The hood may be made of metal, wood or plastic material strong enough to withstand rough handling, yet sufficiently light to be carried with the base portion as a piece of luggage. When positioned as in FIG. 1 the base has feet 18 at the corners; and the hood has a carrying strap 19 on top which flattens down to permit the apparatus to be slid under an airplane seat where space is limited. The hood and the base are held together by conventional fasteners 21, such as are carried by suitcases. When the apparatus is carried it is narrower when set with its side surface 15a up; and a regular handle 20 is attached to this surface to enable the apparatus to be carried in the manner of a suitcase. Also, when so positioned the bottom of the apparatus has feet 15b as seen at the right in FIG. 2.

FIG. 3 shows, with the hood 15 lifted, that a conventional photographic projector 25 rests in a depression 16a of the base 16, and that the projector is held down by buckled straps 27. With the apparatus made of a prescribed length, room is left in it beyond the projector for mounting a film storage box 28 on the base 16; and the box has compartments for accommodating several film cartridges 29. The height of the box floor and cartridges is calculated to have them rise to the top of the hood when it is closed and prevent movement of the cartridges when the apparatus is carried. However, when the hood 15 is removed, the base 16 may be set anywhere to position the projector for casting images on a large screen before a group or audience of spectators.

The alternate use of the apparatus is intended for individual viewing in a limited space, such as on a desk or table in an office. The hood 15 has means for connecting the projector to cast its image on a mirror 30 in the front end of the hood, where the image is reflected back to a rear view screen 31 as indicated by arrow lines 32 in FIG. 5. To secure this effect, the hood 15 must be positioned at an angle to the projector, as shown in the same figure; and the connections between the hood and projector, about to be described, act as supports for the hood and partial supports for the projector, using the latter — which is much heavier than the hood — as a counterweight to keep the apparatus in place.

The connecting means just referred to are clearly shown in FIGS. 5 and 6. They comprise a pair of generally triangular side wings 35 positioned along the inner sides of the hood sidewalls when not in use. The mentioned figures show the wings so positioned, and that they are connected at the bottom to the related hood walls by hinges 37. When the hood and projector are to be connected as stated, the wings 35 are unfolded to the pendent positions indicated in FIGS. 5 and 7 to form a fulcrum. Now they project rearwardly with tapered arms 35a. The intention is to rest the forward portion of the projector on these arms. FIG. 3 illustrates the length of the projector as conforming to that of the hood 15, with the lens mount 25a on the side. By turning the projector crosswise — with the lens mount in front — FIG. 5 shows that its forward portion has been mounted to rest on the arms 35a. These have feet 35b to support the medial portion of the assembly on a flat surface 39, such as a desk top. The projector also has feet 25b, the rear ones resting on such surface when the hood and projector are assembled as stated.

Figure 7:
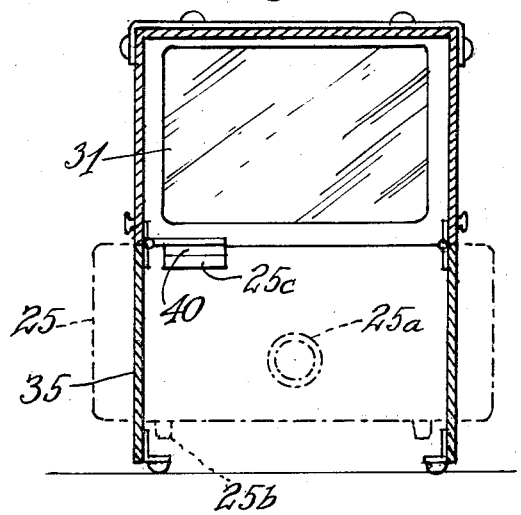
FIG. 7 is a section on the line 7—7 of FIG. 5.

The hood and projector are also joined against separation. Thus, the projector has a top rib 25c at its front end, which is engaged by a hook bar 40 carried by the rear end of the hood, as seen in FIGS. 5 and 7. The hook bar is carried by a cross-board 42 which bars the entry of unwanted light from the rear into the hood. The wings 35, as downward continuations of the hood side walls, also guard against the entry of interfering light from the sides at the level of the beam cast by the projector.

Means are provided to adjust the angle of the mirror 30 both vertically and laterally to insure the accurate casting of the reflected image on the screen 31. Thus, the mirror is contained in a frame 30a which receives bolts 44 at the corners directed through springs 45 and the front wall of the hood to receive wing nuts 46. Advancing these will draw on the mirror forwardly to change either its vertical or lateral angle.

Since the screen 31 is exposed, a protector 48 is provided for it. It may be made of leather or other plastic material and of rectangular form to fit the end of the hood; and the protector is flanged on the sides to overlap such end. The flanges are secured to the hood by snap fasteners 48a when the protector is mounted as seen in FIG. 3. However, when the viewer is in use, the protector may be projected from the hood as seen in FIG. 5 to serve as a light shade, top fasteners 48b being used for attaching the protector to the hood.

Figure 8:
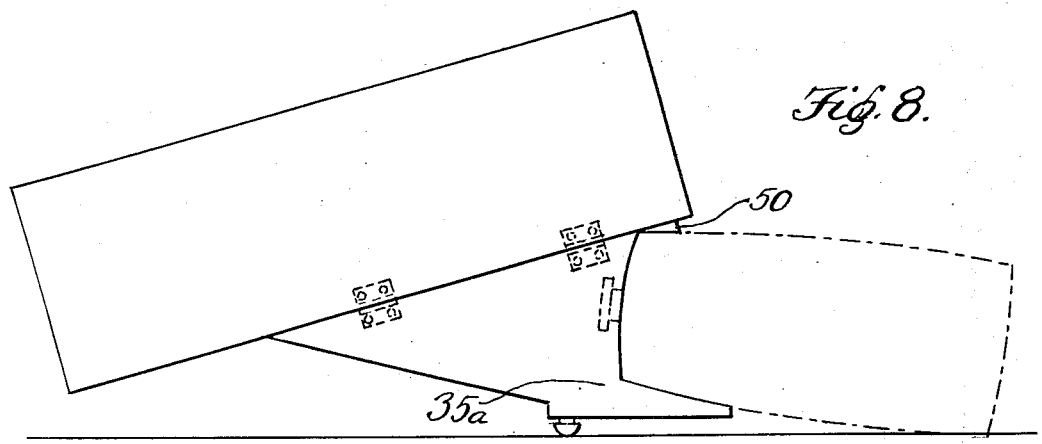
FIG. 8 is an elevation similar to FIG. 5 showing the use of the viewer with a modified projector.

FIG. 8 shows a modification where the top and bottom surfaces of the projector are convex. In this case the arms 35a of the wings 35 are made concave to suit the curvature of the projector surfaces. Also, because of the length and weight distribution of the projector the forward thrust block 40 is not needed and can be replaced by a block 50 shaped to fit the contour of the upper surface of the projector.

Figure 9:
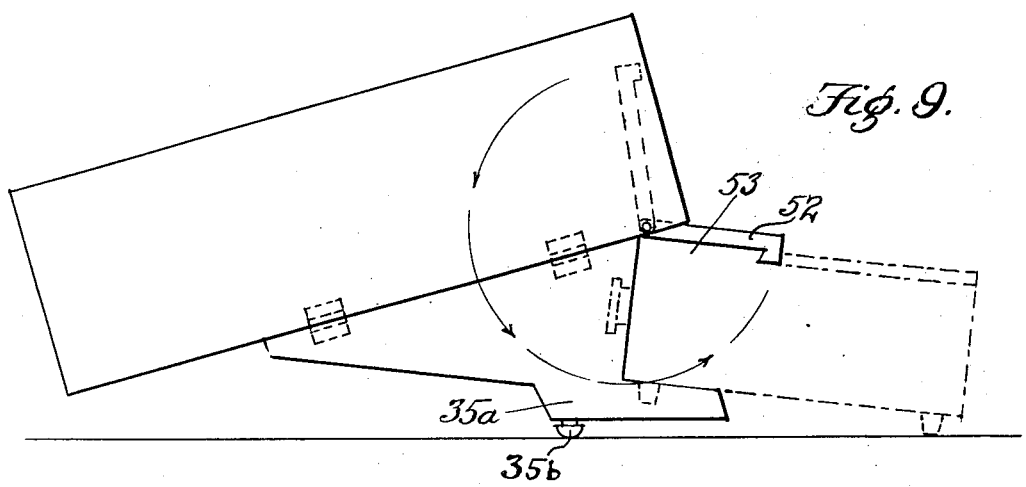
FIG. 9 is a similar view showing a further modification.

FIG. 9 shows a further modification. A pair of hooks 52 are shown pivoted with their lower ends to the side walls of the hood. The projector is made with a crossrib 53 on top, and the hooks 52 engage the same as shown to connect the hood to the projector. This connection allows the forward thrust to be counteracted further back by the hooks 52. These are folded into the hood as indicated by finely dotted lines when the hood is separated from the projector or joined to the base.

It may now be pointed out that the assembly of a shadow box with a projector to present a screen viewed from the rear is not a novel concept. However, such apparatus of this nature as has come to my attention has not been made sufficiently compact to fit limited luggage space for air travel, or for handling like personal luggage. On the other hand, FIGS. 1 and 3 show how compactly the novel apparatus is assembled both to conform to air travel regulations or be carried like a suitcase. Further, the hood is not merely raised at the rear to receive the projector for casting a reflected image on the screen, but carries means for coupling the forward portion of the projector with the hood for support on a desk or table and individual viewing, the rear part of the much heavier projector securing added support both to hold the apparatus steady and maintain the hood in place without a frontal support. The hood is thus in a raised position, clearing articles kept on the desk or papers which should not be disturbed. Yet, when the hood is uncoupled from the projector, the latter may be used independently to project a large image in front of a group or audience; and the hood functions as a shadow box when the wings are in the lowered position and out of the way. No other parts are then contained in the hood, to interfere with the passage of light through same. The present improvement is therefore a self-contained apparatus which is conveniently carried and readily usable either for frontal large image casting or for individual rear screen viewing in a limited space.

I claim:

1. In a combined carrier and viewer for a projector comprising a base having means to securely hold a projector placed thereon for transport and a hood-viewer assembly detachably mountable on said base in locking engagement therewith to form said carrier, said assembly comprising, in combination, a hood in the form of an open-bottom rectangular structure to serve as the closure for said base and to provide a viewer housing when removed from said base, a mirror movably positioned on the interior surface of one end of said hood, a viewing screen forming the opposing end of said hood, and means pivotally mounted along the interior surface of each of the opposing side walls of said hood and extensible downwardly from said side walls as a support for said hood when removed from said base to simultaneously position the mirror end of said hood in front of a projector and support the forepart of said projector in image-projecting alignment with said mirror.

2. The carrier of claim 1 wherein each of said projector support means comprises a triangularly shaped wing having a tapered arm extending rearwardly under said projector as a support therefor, the wing resting as a fulcrum on a supporting surface, the hood being suspendedly positioned on one side of the fulcrum above said surface, the projector being positioned on the other side thereof on said arms as a counterweight to maintain the hood elevated from said surface.

3. The carrier of claim 2, further comprising fastening means on the lower edge of the hood at the screen end thereof to connect said hood to said projector to maintain the latter in the supported position on said arms.

4. The carrier of claim 1 further comprising a protector plate for said screen end of said hood, said plate being flanged along its sides to overlap said end, said plate further having first fastening means engagin second fastening means on said hood to permit positioning said plate over said screen as a protector.

5. The carrier of claim 2 wherein said first fastening means engage third fastening means on the top surface of said hood to position said plate as a light shade for said screen.

6. The carrier of claim 3 wherein said hood fastening means comprises at least one hook-shaped element to engage a rib on the upper surface of said projector.

7. The carrier of claim 3 wherein said hood fastening means comprises a wedging element having an under surface conforming to the upper surface of said projector.

* * * * *